No. 825,935. PATENTED JULY 17, 1906.
P. POVLOTZKY.
MACHINE FOR DELIVERING LIQUIDS.
APPLICATION FILED SEPT. 6, 1905.
5 SHEETS—SHEET 1.
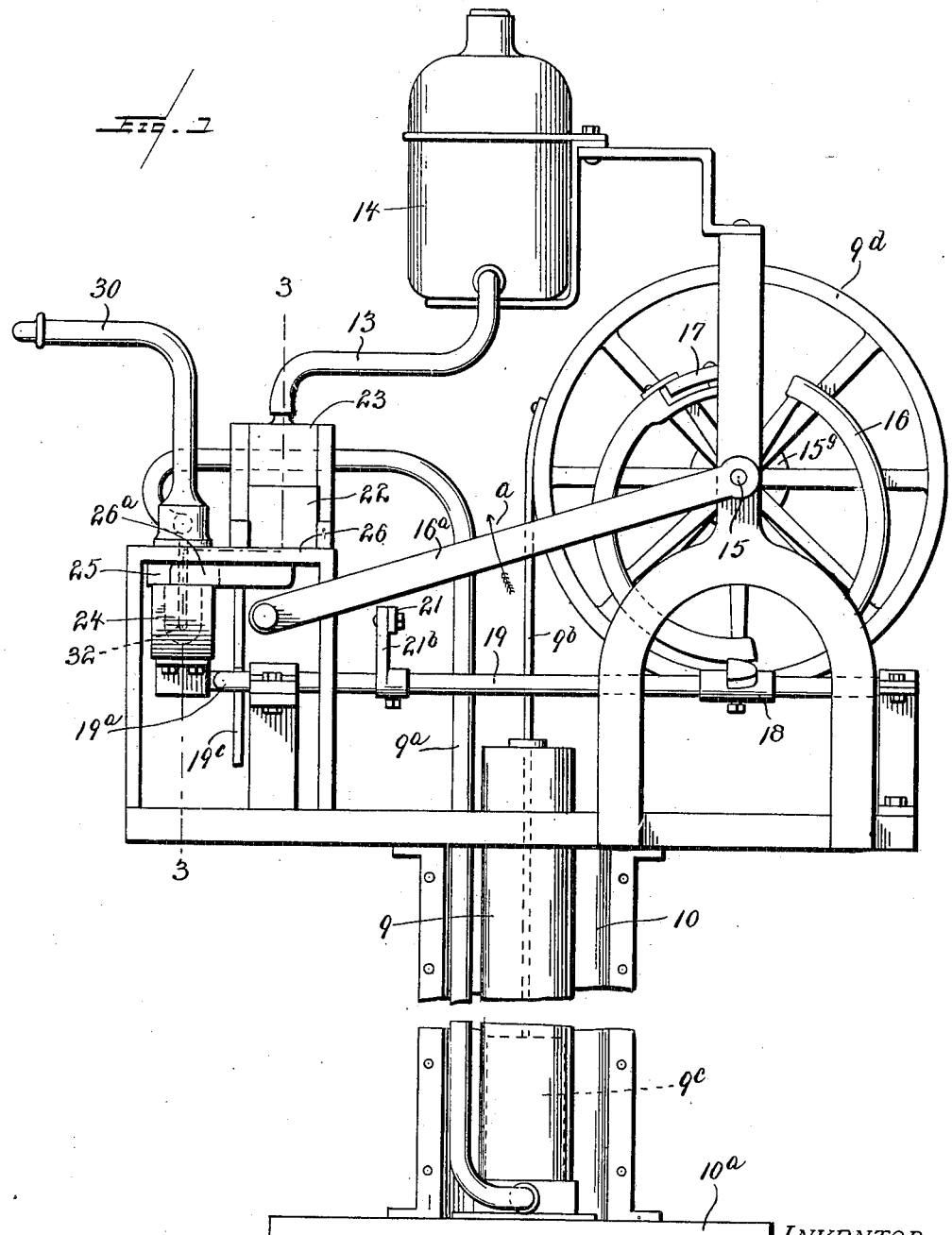

No. 825,935. PATENTED JULY 17, 1906.
P. POVLOTZKY.
MACHINE FOR DELIVERING LIQUIDS.
APPLICATION FILED SEPT. 6, 1905.
5 SHEETS—SHEET 2.
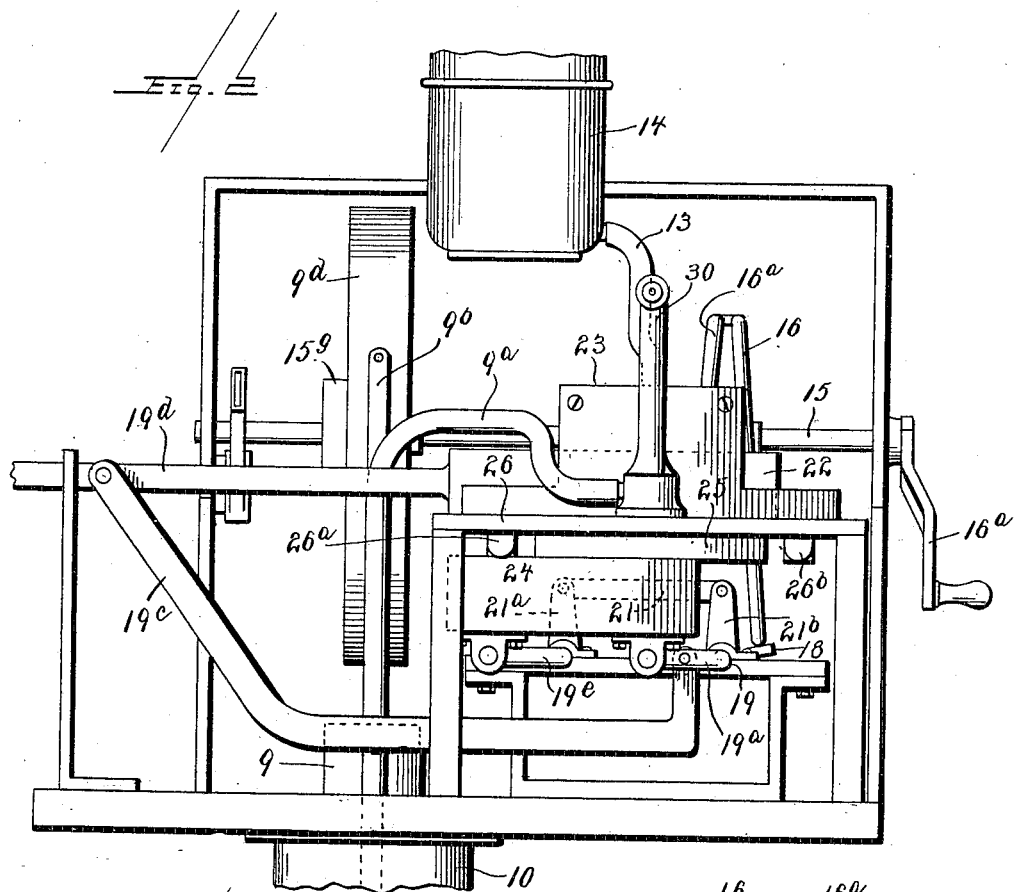
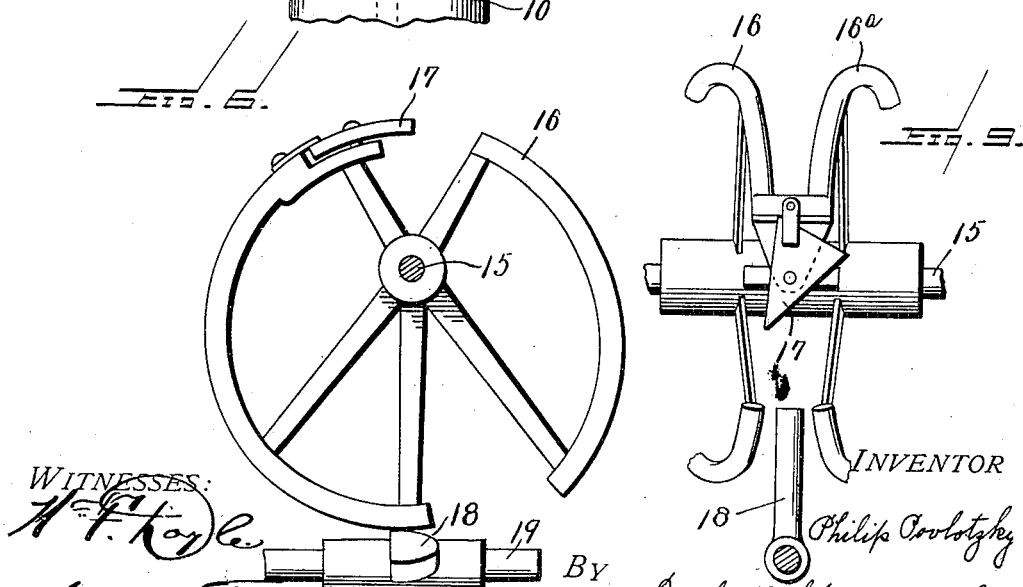

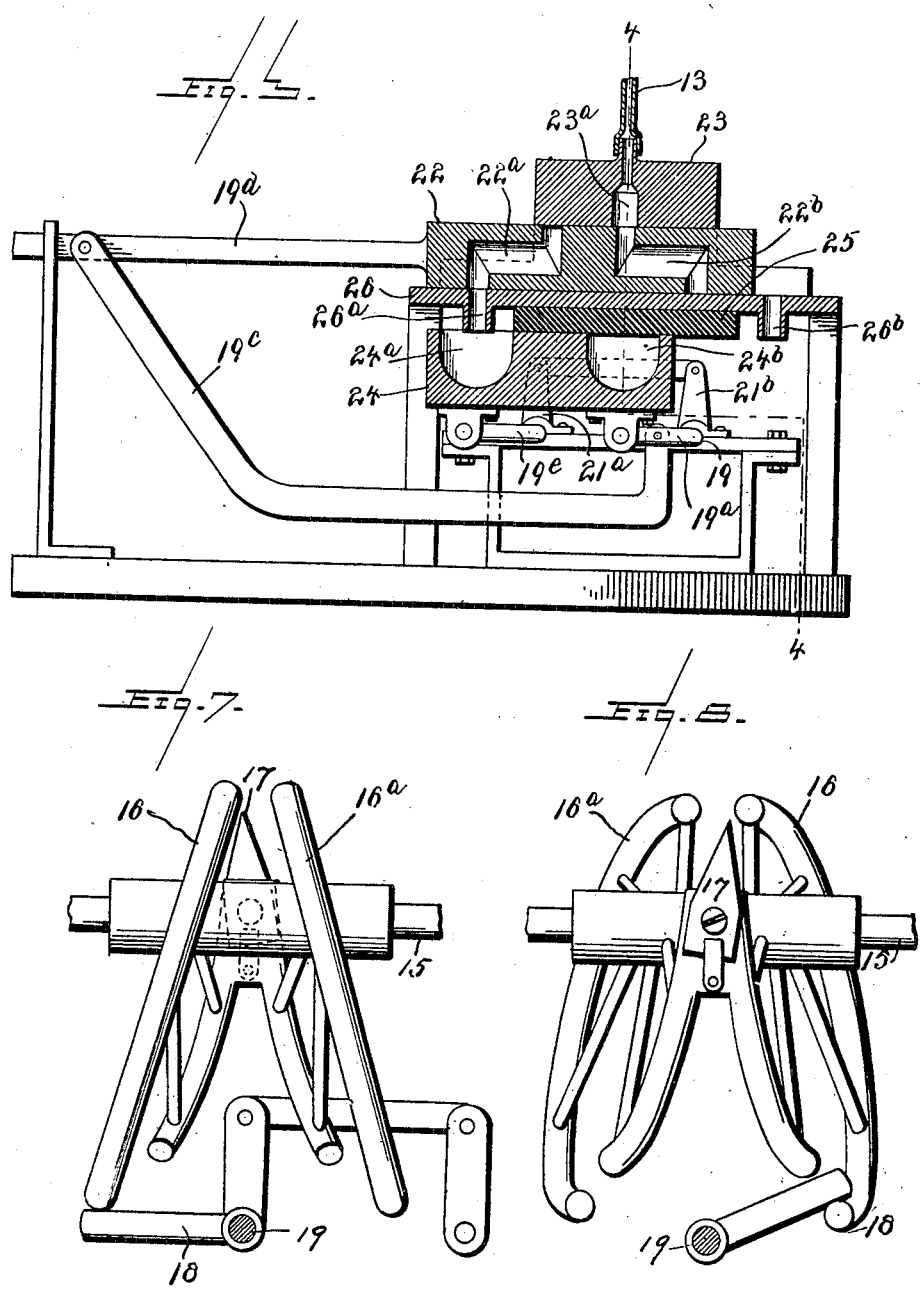

No. 825,935. PATENTED JULY 17, 1906.
P. POVLOTZKY.
MACHINE FOR DELIVERING LIQUIDS.
APPLICATION FILED SEPT. 6, 1905.
5 SHEETS—SHEET 4.
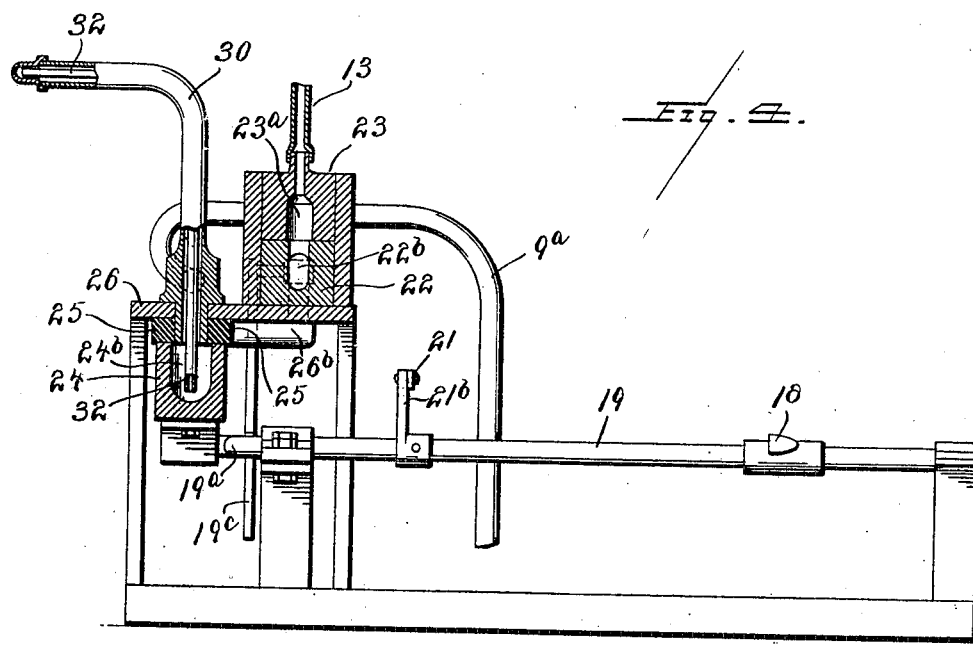
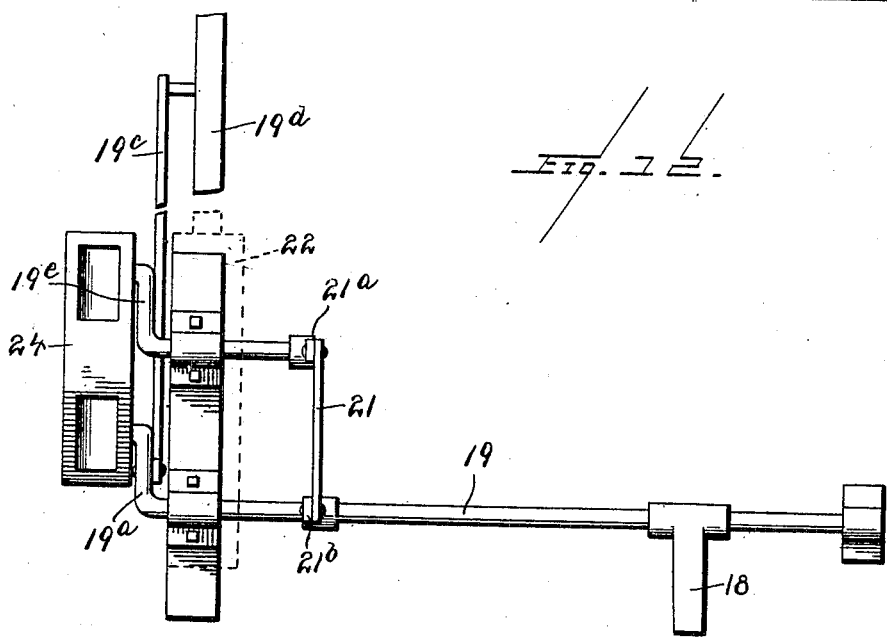
WITNESSES:
W. F. Koyle
Geo. E. Tew
INVENTOR
Philip Povlotzky,
BY Milo B. Stevens & Co.
Attorneys No. 825,935. PATENTED JULY 17, 1906.
P. POVLOTZKY.
MACHINE FOR DELIVERING LIQUIDS.
APPLICATION FILED SEPT. 6, 1905.
5 SHEETS—SHEET 5.
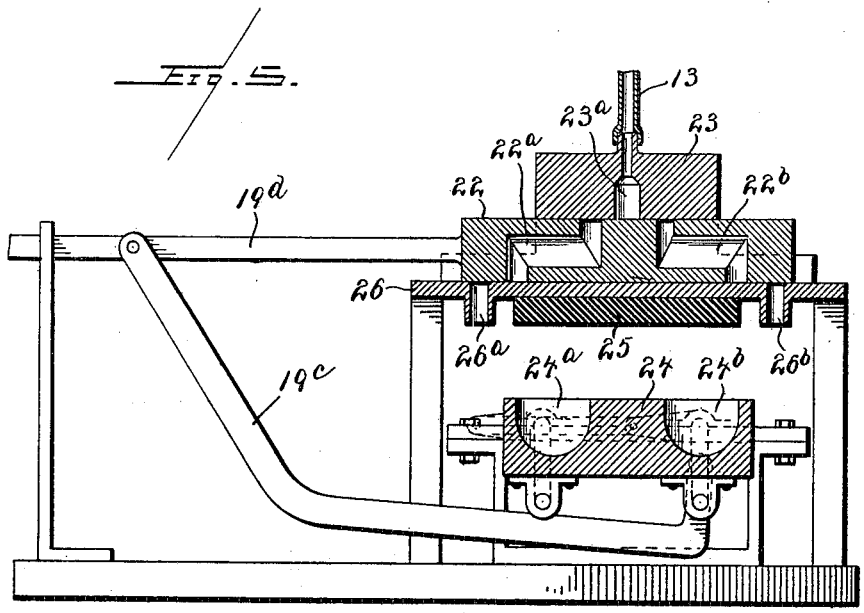
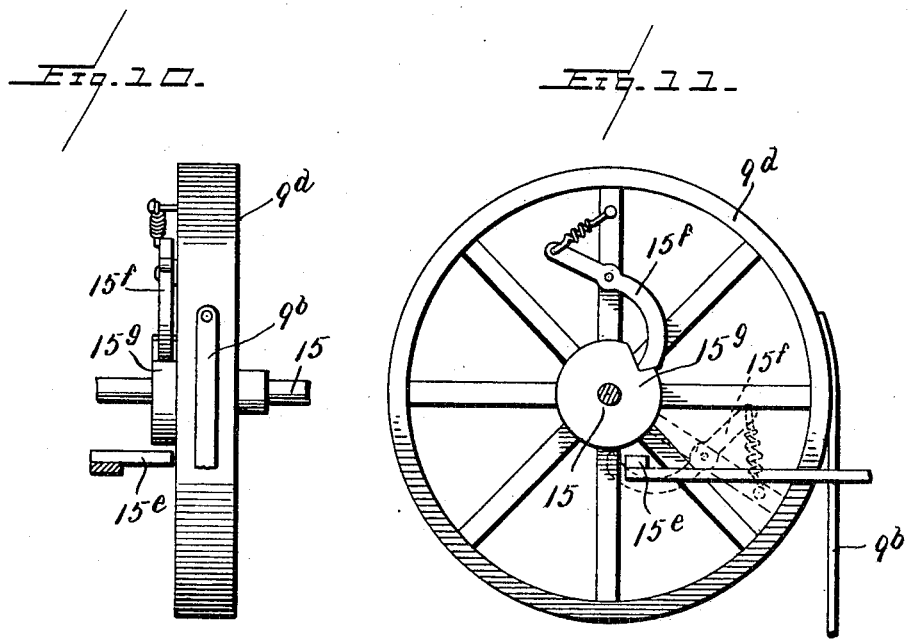
WITNESSES
INVENTOR
Philip Povlotzky,
By Milo B. Stevens & Co.
Attorneys.

UNITED STATES PATENT OFFICE.

PHILIP POVLOTZKY, OF CHICAGO, ILLINOIS.

MACHINE FOR DELIVERING LIQUIDS.

No. 825,935.  Specification of Letters Patent.  Patented July 17, 1906.

Application filed September 6, 1905. Serial No. 277,243.

*To all whom it may concern:*

Be it known that I, PHILIP POVLOTZKY, a citizen of the United States, residing at Chicago, in the county of Cook and State of Illinois, have invented new and useful Improvements in Machines for Delivering Liquids, of which the following is a specification.

This invention is an apparatus for delivering liquid, such as perfume, through an atomizer, the delivery being controlled by coin-operated mechanism.

The device embraces a charging-valve which controls the flow of fluid from the reservoir to a receptacle having cups to receive the fluid, and which receptacle is shifted by the operation of the machine to bring the cup in position to be discharged by a blast of air produced by an air-pump which is operated by the manipulation of the machine. The charging-valve and discharging-receptacle have double passages and cups, so that one cup is always full and ready to be discharged. The movement of the valve and discharging-receptacle and of the other parts is produced by novel mechanical devices which are described hereinafter.

In the accompanying drawings, Figure 1 is a side elevation of the machine. Fig. 2 is a front elevation. Fig. 3 is a section on the line 3 3 of Fig. 1. Fig. 4 is a section on the line 4 4 of Fig. 3. Fig. 5 is a section similar to Fig. 3, but showing the discharging-receptacle in an intermediate position, as in its movement to shift the cups with respect to the atomizing or discharging tube. Fig. 6 is a detail in side view of a double cam controlling the shift of the receptacle. Figs. 7 and 8 are front and rear views of the cams. Fig. 9 is a detail showing the cams and shifting device in mid-position. Figs. 10 and 11 are details in side and end view, showing the pawl-and-ratchet connection between the operating-shaft and the wheel which operates the pump. Fig. 12 is a detail in plan view, showing the connections between the shaft and the shifting-receptacle, parts above said receptacle being removed.

Referring specifically to the drawings, 10 indicates the hollow post, mounted on the base $10^a$, serving as a supporting-standard for the machine. Within the said post is located an air-pump 9, having a tube $9^a$ leading to the atomizing or delivery tube 30. The pump may be of any desired construction, but is preferably constructed with a plunger $9^c$ within the barrel of the pump, connected by a strap $9^b$ with a wheel $9^d$, which is mounted loosely on the main shaft 15 of the machine. The wheel has a pawl-and-ratchet engagement with the shaft, so that the wheel will turn when the shaft is turned in one direction, but not in the other. The shaft has a crank-handle $16^a$. When turned in the direction of the arrow $a$, Fig. 1, the wheel turns and lifts the plunger of the pump. The pawl is shown at $15^f$ carried by the wheel and engageable in the notch of the ratchet $15^g$ on the shaft. On reaching a certain point—that is, when the pump-plunger is at the top of the barrel—the pawl $15^f$ strikes a projecting finger $15^e$, secured to the frame of the machine, and is thrown out of engagement with the notch, which releases the wheel and allows the plunger to slide down by its own weight in the pump-barrel, and thus force out the air therein, which discharges the liquid from one of the cups, as will more fully hereinafter appear.

Mounted on the shaft 15 are cams 16 and $16^a$, having irregular or eccentric-shaped rims and carrying between them a switch-point 17, which acts to strike and shift an arm 18, (see Figs. 8 and 9,) mounted on a shaft 19, supported in bearings in the frame of the machine. This shaft is for operating the charging-valve 22 and also the discharging-receptacle 24, from which the fluid is delivered through the atomizing-tube 30. The shaft 19 makes a half-turn in consequence of the movement of the arm 18, produced by the cams 16 and $16^a$, the rims of which engage said arm. At the beginning of the turn of the shaft 15 one cam, say 16, engages said arm, as shown in Fig. 8, and turns it up to middle position, as shown in Fig. 9. It is then struck by the switch and thrown over to the opposite cam $16^a$, by which it is engaged and caused to make another quarter-turn, so that the shaft 19 makes in all a half-turn, which is necessary to shift the block 24 from one position to the other. In passing the switch-piece 17 the arm 18 leaves the switch in such position as to strike the arm at the next revolution of the cams 16 and $16^a$, and thus throw the arm to the opposite side at the next operation.

The valve 22 is a slide-valve, sliding upon a base-plate 26 and having two angular ports 22ª and 22ᵇ. The stem 19ᵈ of this valve is connected by a bent rod 19ᶜ to a crank 19ᵃ (see Fig. 12) on the shaft 19. Beneath the valve 22 the base-plate 26 has two depending nipples 26ª and 26ᵇ, with which, respectively, the ports 22ª and 22ᵇ will register in the reciprocation of the valve. Fluid is delivered to the respective passages in the valve from the reservoir 14, which is supported on the frame of the machine, through a pipe 13 and through a passage 23ª in the block 23, which forms the top of the casing in which the valve works. The nipples 26ª and 26ᵇ act as ducts from the valve into the cups 24ª and 24ᵇ of the shifting block or receptacle 24, and in the operation of the machine fluid is fed alternately through said nipples to the respective cups.

Arranged in parallelism to the crank 19ª is a crank 19ᵉ, and the block 24 is mounted upon and carried by these cranks. Simultaneous operation of the cranks is effected by a link 21, connecting arms 21ª and 21ᵇ on the respective crank-shafts. The cranks swing back and forth as the shaft 19 is turned one way or the other to bring the cups into a position to alternately receive fluid from the respective nipples, so that one or the other of the cups will be under one of the nipples and from which the cup receives a charge of the fluid when the valve is moved to the proper position.

Mounted upon the plate 26, in a position midway between the nipples 26ª and 26ᵇ is the delivery and atomizing tube, comprising an outer air-tube 30, to which air is supplied by the pump through the tube 9ª, and within the tube 30 is a similar tube 32 for the liquid. This latter tube projects below the plate 26 and also through and below a rubber cushion 25, attached to the under side thereof. Said tube 32 projects far enough to reach almost the bottom of the cups. A charge of fluid having been put in the cup by the means above indicated, the block 24 is shifted to bring the cup up under said tubes and against the rubber cushion 25. The purpose of the rubber cushion is to make an air-tight connection, so that the fluid, under pressure, will be delivered only through the atomizing-tubes. Having reached this position, the air-pressure begins by release of the weighted plunger 9ᶜ, and the air entering through the tube 9ª forces the liquid up and out through the tube 32 to delivery.

What I claim as new, and desire to secure by Letters Patent, is—

1. In a machine for delivering liquids, the combination with a valve-controlled supply-pipe, and a delivery-pipe having means to supply air-pressure thereto, of a cup adapted to carry liquid and movable from the supply-pipe to the delivery-pipe.

2. In a machine for delivering liquids, the combination with a valve-controlled supply-pipe having a pair of outlets spaced apart, and a delivery-pipe having an inlet between said outlets and an air-pressure supply, of a pair of cups shiftable in alternation from the supply-pipe outlets respectively to the inlet of the delivery-pipe.

3. In a machine for delivering liquids, the combination with a valve having a pair of ports, a supply-pipe connecting with one or the other thereof, as the valve is moved, and a pair of outlets with which the ports respectively connect, of a delivery-pipe depending between said outlets, a pair of cups located under said valve and arranged to receive liquid from the outlets and supply same to the delivery-pipe, and means to swing the cups in alternation from the outlets respectively to the delivery-pipe, and constructed to lift the cups so that the delivery-pipe will extend into the same.

4. In a machine for delivering liquids, the combination of a delivery-pipe, a pump supplying air thereto, a manually-operated member, and means actuated thereby to simultaneously supply liquid to the pipe and to operate the pump.

5. In a machine for delivering liquids, the combination of a delivery-pipe, a pump supplying air thereto, a shaft, means actuated by the shaft to supply fluid to said pipe, and operative connections between the shaft and the pump, arranged to operate the pump when the fluid is so supplied.

6. In a machine for delivering liquids, the combination with a delivery-pipe, and liquid-supply devices arranged to supply liquid thereto, of a shaft operatively connected to said devices, a wheel loose on the shaft, an air-pump having a weighted plunger connected to said wheel and a pipe connected to the delivery-pipe, a pawl and ratchet between the wheel and shaft, and means to release the same at a predetermined point.

7. In a machine for delivering liquids, the combination with supply and delivery pipes spaced apart, of a cup movable from one to the other, and means to so move the cup comprising rocking crank-shafts on the cranks of which the cup is carried, said shafts being connected together and one of them having a projecting arm, and a manually-operated shaft having thereon cams arranged to strike said arm and rock the said shafts.

8. In a machine for delivering liquids, the combination with a delivery-tube having an air-supply thereto, and an inlet and outlet for the liquid, of a cup having a liquid-supply thereto, means to move the cup to and from the said inlet, and an elastic piece surrounding the inlet against which the top of the cup is pressed, when moved thereto.

9. In a machine for delivering liquids, in combination, supply and delivery pipes, a shifting cup movable between said pipes and arranged to carry liquid from one to the other, a valve in the supply-pipe, a pump connected to the delivery-pipe, and a shaft operatively connected to the valve, the cup and the pump.

10. In a machine for delivering liquids, in combination, a supply-pipe, a cup movable to and from the same, a delivery-pipe having a smaller tube within the same, to and from which the cup is movable, the smaller tube projecting downwardly so that it dips into the cup when the same is moved thereto, and an air-pressure pipe connected to the delivery-pipe.

In testimony whereof I have signed my name to this specification in the presence of two subscribing witnesses.

PHILIP POVLOTZKY.

Witnesses:
SIGNA FELTSKOG,
H. G. BATCHELOR.